United States Patent
Lott et al.

(10) Patent No.: US 10,362,441 B1
(45) Date of Patent: Jul. 23, 2019

(54) COMMUNICATIONS BASED ON GEO LOCATION INFORMATION

(71) Applicant: Vivint, Inc., Provo, UT (US)

(72) Inventors: Tim Lott, Orem, UT (US); Brandon Bunker, Highland, UT (US)

(73) Assignee: Vivint, Inc., Provo, UT (US)

(\*) Notice: Subject to any disclaimer, the term of this patent is extended or adjusted under 35 U.S.C. 154(b) by 0 days.

(21) Appl. No.: 15/820,049

(22) Filed: Nov. 21, 2017

Related U.S. Application Data (63) Continuation of application No. 15/237,637, filed on Aug. 16, 2016, now Pat. No. 9,848,296, which is a continuation of application No. 14/456,706, filed on Aug. 11, 2014, now Pat. No. 9,439,034.

(51) Int. Cl.
| | |
|---|---|
| *H04W 4/021* | (2018.01) |
| *H04L 12/28* | (2006.01) |
| *H04L 12/58* | (2006.01) |
| *H04W 4/14* | (2009.01) |
| *H04W 88/06* | (2009.01) |

(52) U.S. Cl.
CPC ......... *H04W 4/021* (2013.01); *H04L 12/2803* (2013.01); *H04L 12/2825* (2013.01); *H04L 51/04* (2013.01); *H04W 4/14* (2013.01); *G08C 2201/91* (2013.01); *H04L 2012/2841* (2013.01); *H04W 88/06* (2013.01)

(58) Field of Classification Search
CPC ................................ H04W 4/02; H04W 4/021
USPC ...................................................... 340/573.4
See application file for complete search history.

(56) References Cited

U.S. PATENT DOCUMENTS

| | | |
|---|---|---|
| 2007/0210936 A1 | 9/2007 | Nicholson |
| 2008/0125964 A1 | 5/2008 | Carani et al. |
| 2010/0289644 A1* | 11/2010 | Slavin ............... G08B 13/2402 340/568.1 |
| 2013/0045753 A1 | 2/2013 | Obermeyer et al. |
| 2013/0189946 A1 | 7/2013 | Swanson |
| 2013/0324166 A1 | 12/2013 | Mian et al. |
| 2014/0308977 A1 | 10/2014 | Cheung et al. |
| 2015/0123787 A1 | 5/2015 | Watson et al. |
| 2015/0163630 A1 | 6/2015 | Hughes et al. |

OTHER PUBLICATIONS

Best Home Alarm System Reviews, Alarm.com now offers Geo-location services with Smartphone Apps, available on http://www.besthomealarmsystemsreviews.com/alarm-com-now-offers-geo-location-services-with-smartphone-apps/, as early as Sep. 15, 2012.

\* cited by examiner

*Primary Examiner* — Kevin Kim
(74) *Attorney, Agent, or Firm* — Holland & Hart LLP (57) ABSTRACT

Methods and systems are described for communicating messages using a home automation system. An example computer-implemented method for communicating based on geo location information using an automation and security system includes determining a geo location of a person relative to a property being monitored by the automation and security system, and automatically delivering a message to the person based on the geo location.

18 Claims, 10 Drawing Sheets

COMMUNICATIONS BASED ON GEO LOCATION INFORMATION

CROSS-REFERENCE TO RELATED APPLICATIONS

The present application is a continuation of U.S. patent application Ser. No. 15/237,637, titled: "COMMUNICATIONS BASED ON GEO LOCATION INFORMATION", filed on Aug. 16, 2016, which is a continuation of U.S. patent application Ser. No. 14/456,706, titled: "COMMUNICATIONS BASED ON GEO LOCATION INFORMATION", filed on Aug. 11, 2014. The disclosures of which are incorporated by reference herein in their entireties.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, opportunities exist for improved communications between users of a home automation and security system. In most homes, businesses, or other properties monitored by an automation and security system, occupants frequently enter and exit the property. It is often difficult to keep track of where the occupants are located relative to the property. An occupant's location relative to the property may influence the types and frequency of communications that take place between the occupants and the automation and security system.

SUMMARY

Methods and systems are described for communicating messages using a home automation system. An example computer-implemented method for communicating based on geo location information using an automation and security system includes determining a geo location of a person relative to a property being monitored by the automation and security system, and automatically delivering a message to the person based at least in part on the geo location.

In one example, the method further includes establishing at least one rule based at least in part on the geo location, and automatically delivering the message to the person based on the at least one rule. The message may include at least one of a text message, an audio message, a two-way call, and an email. The message may be a pre-recorded audio message.

The method may include determining a geo fence associated with the property, wherein determining that the geo location is outside of the geo fence prompts automatic delivery of the message. The method may include determining a change in the geo location, and automatically delivering the message based on the change in geo location.

Another embodiment is directed to an apparatus for communicating based on geo location information using an automation and security system. The apparatus includes a processor, a memory in electronic communication with the processor, and instructions stored in the memory. The instructions are executable by the processor to determine a geo location of a person relative to a property being monitored by the automation and security system, establish at least one rule for delivering a message to the person based at least in part on the geo location, and delivering a message to the person when the at least one rule is satisfied.

In one example, the message may be delivered through a control panel of the automation and security system. The at least one rule may be established via a user interface of the automation and security system. The geo location may be determined at least in part from a global position system (GPS) device carried by the person. The message may be delivered to a mobile computing device carried by the person. The at least one rule may include a plurality of rules, and delivering the message may occur after at least two of the plurality of rules are satisfied.

A further embodiment is directed to a non-transitory computer-readable medium storing instructions executable by a processor to establish a rule, wherein at least one criteria for the rule includes a geo location of a person associated with a property monitored by the automation and security system. The instruction may be executable to determine the geo location of the person, and automatically deliver a message from a control panel of the automation and security system to the person when the rule is satisfied.

In one example, the rule may be established via user input at the control panel. The geo location may be determined at least in part by communications with a global positioning system (GPS) device carried by the person. The message may be delivered to a device carried by the person that includes the GPS device. The instructions may be executable to receive a manual input from at least one user that authorizes delivery of the message. The message may be delivered automatically when the rule is satisfied. The message may be conveyed via a two-way call initiated by the control panel. The control panel may include a speaker and a microphone, and the control panel operates as a speaker phone for two-way audible communication with the person.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

One aspect of the present disclosure relates to using geo location information to help determine the location of one or more persons associated with a property monitored by an automation and security system relative to a geographic boundary associated with the property. For example, geo location devices may help determine whether the person is within a room or on a particular floor of a building, or within a yard or neighborhood surrounding a building. The geo location information may be used according to one or more predetermined rules to communicate with the person (e.g., send messages). In one example, a control panel of a home automation system may receive geo location information for each of a plurality of persons associated with a home. For those persons who are located outside of a geo fence (e.g., outside of a yard surrounding the home) at a given time of day (e.g., 5:00 p.m.), the home automation system (e.g., via the control panel) sends a first message to those persons such as, "dinner will be served at 5:15, please return home." For those persons who are within the geo fence at the given time, no message is sent, a second message is sent that is different from the first message, or a second message is sent at a different time than when the first message is sent.

The message may be sent automatically based on one or more rules. In other embodiments, at least some of the steps involved in sending the message or otherwise communicating with the persons are performed manually. For example, a customized message may be generated by a first person that is sent to one or more second persons based at least in part on the geo location information related to the one or more other persons. In another example, the message is manually authorized or customized before being sent.

The message may be conveyed in a number of ways and/or formats. For example, the message may be a text message, an audible message, a one-way or two-way cellular call, a vibration, an email, or the like. The occupant may receive the message via various devices including, for example, a smart phone, pager, tablet computer, laptop computer, or other mobile and/or handheld computing device. The device via which the message is conveyed may include GPS features that help determine the geo location of the occupant. In some examples, a GPS device separate from the device used to convey the message is used to determine the geo location of the occupant.

Figure 1:
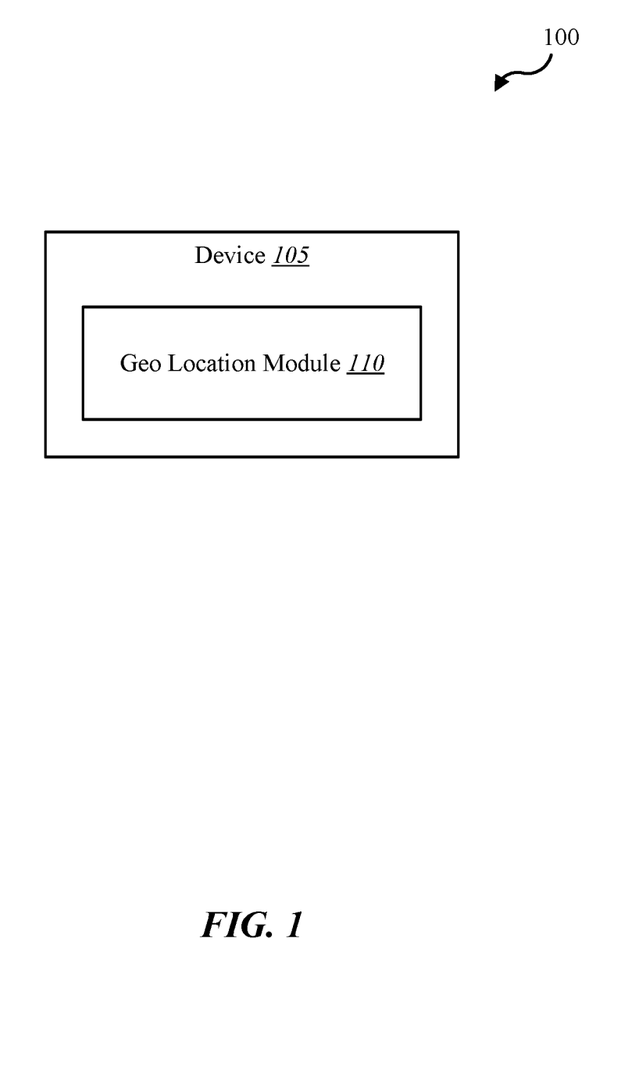
FIG. 1 is a block diagram of an environment in which the present systems and methods may be implemented.

FIG. 1 is a block diagram illustrating one embodiment of an environment 100 in which the present systems and methods may be implemented. In some embodiments, the systems and methods described herein may be performed at least in part on or using a device 105. Device 105 may include a geo location module 110. Geo location module 110 may provide various functions and include a number of other operational modules as described below with reference to FIG. 6. Geo location module 110 may operate to provide the communication based at least in part on geo location information about one or more persons. One or more rules may control generation and delivery of the message.

Device 105 may include, for example, a control panel of a home automation system that is part of or defines environment 100. Alternatively, device 105 may be a handheld computing device that operates a mobile application in the form of, for example, geo location module 110. Device 105 may communicate with or otherwise be linked to a home automation system. In one example, device 105 communicates with a control panel, backend server, or central station of a home automation system. Other computing devices such as desktop computers, tablet computers, laptop computers, or a computing device dedicated solely to operating geo location module 110 may operate as device 105 and may be part of or in communication with a home automation system.

Geo location module 110 may operate using device 105. Geo location module 110 may receive data or other information from a plurality of sources and operate to generate one or more communications based on the received data. As mentioned above, at least some of the data may be geo location information related to one or more persons. The geo location information, alone or in combination with other information and/or criteria such as time of day, day of week, demographics or other information about the person associated with the geo location information relates, particular events or activities, and the like, may be used as part of generating the content of the communication and how the communication is carried out. At least some functions of geo location module 110 may occur automatically. Other features and functionality of geo location module 110 may operate in response to manual input from one or more persons. For example, one or more persons may control, program or otherwise interface with geo location module 110 via a user interface of device 105. Additionally, or alternatively, geo location module 110 may operate in response to instructions or controls from a remote device such as a mobile handheld computing device.

Geo location module 110 may generate one or more messages for one or more people based at least in part in geo location information. The geo location information may relate to a location of the one or more persons who receive the message. Additionally, or alternatively, the person who receives the message is someone different from the person associated with the geo location information relates. For example, when a child crosses a geo fence a message may be sent to a parent to warn the parent of the child's location and/or direction of travel. In another example, the child receives a message when the child crosses a geo fence. In a still further example, the child receives a message at a certain time of day if a geo location device carried by the child indicates that the child is outside of a geo fence or located within a specific geographic area. The message may be sent in any of a number of formats and/or mediums. The message may be received by a computing device such as, for example, a handheld mobile computing device or other device that is capable of communicating a message. In one example, the message may be conveyed via a wristband that displays a message on a screen, generates an audible sound, or creates a vibration as part of communicating a message to a wearer. In another example, the device is a smartphone that operates a mobile app and/or displays a text message on a display screen thereof. In a still further example, the device is a desktop computer, control panel, audio system, or the like that is permanently mounted at a property. The message may be communicated over a network, such as a wired or wireless network.

Geo location module 110 may receive feedback or responsive communication from the person to whom the original message was sent. In one example, the original message sent via operation of geo location module 110 requests a response from the person to whom the message is sent. For example, the sent message may include a question such as "when will you be home," or "where are you now." The person receiving the message may respond using the same or different communication medium with an answer such as, "I will be home at 6 o'clock" or "I'm at the grocery store." Geo location module 110 may generate a second message either automatically or manually back to the person who received the original message, the person who generated the original message, or a third party. In at least some examples, geo location module 110 facilitates two-way communication such as a two-way voice call as part of communicating a message. Geo location module 110 may use a combination of communication mediums and/or formats to communicate information. For example, the original message may be in the form of a text and a follow-up second message may be in the form of an audio message or a video clip.

Figure 2:
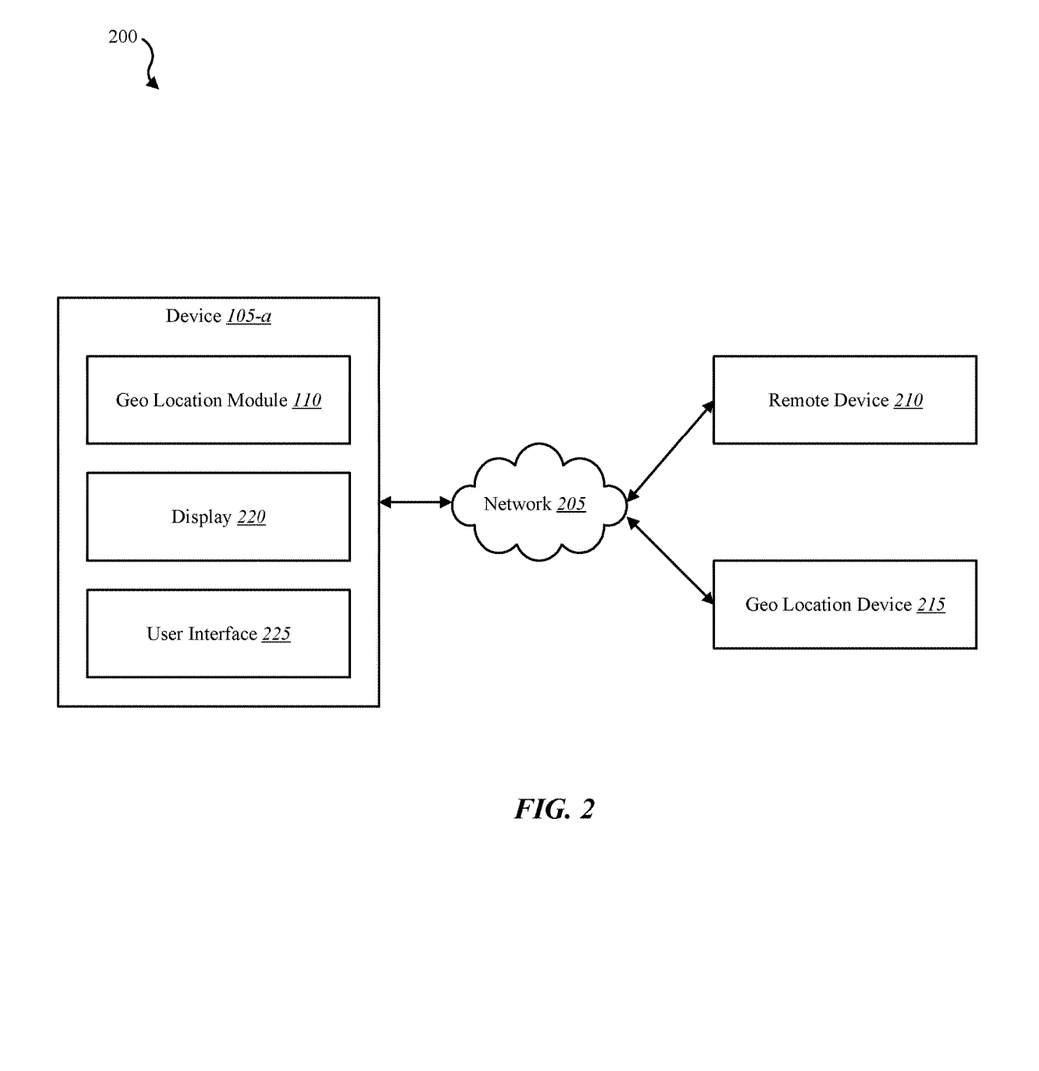
FIG. 2 is a block diagram of another environment in which the present systems and methods may be implemented.

FIG. 2 is a block diagram illustrating one embodiment of an environment 200 in which the present systems and methods may be implemented. Environment 200 may include the same or similar components as discussed above related to environment 100. In some environments, the systems and methods described herein may be performed at least in part on or using a device 105-*a* that communicates via a network 205 with a remote device 210 and a geo location device 215. Device 105-*a* may include the geo location module 110, a display 220, and a user interface 225.

Geo location module may receive geo location information from geo location device 215. The geo location module 110 may generate, for example, a message, notice, or other communication based at least in part on the geo location information from geo location device 215. The message may be delivered via network 205 to remote device 210 for the benefit of one or more persons carrying and/or in communication with remote device 210.

A user may establish one or more rules related to operation of geo location module 110 via display 220 and/or user interface 225. For example, a plurality of options may be presented to a user on display 220 and the user may select among those options via user interface 225. In at least some examples, user interface 225 is integrated into display 220 in the form of, for example, a touch screen display. The displayed options may be selected among for the purpose of establishing criteria for execution of a rule, such as a rule associated with geo location information. In other examples, display 220 may prompt a user for authorization to send a message to remote device 210 in response to the geo location information received from geo location device 215. Display 220 and user interface 225 may be used to authenticate one or more users of device 105-*a*.

Display 220 may also display responsive messages from remote device 210 that are received at device 105-*a* in response to a message sent from geo location module 110. User interface 225 may provide an interface for the user to respond to the responsive message received from remote device 210. In at least some examples, the responsive message may be sent from a different device than the remote device 210 to which the original message is sent. In some examples, geo location device 215 is operated by remote device 210 and/or integrated into a common housing with remote device 210. Additionally, or alternatively, the information from geo location device 215 may relate to a different person than the person that is associated with remote device 210. In one example, geo location device 215 is carried by a child and the geo location information relates to a position of the child relative to a geo fence. The remote device 210 may be carried by a parent or person supervising the child and the message sent to remote device 210 is based at least in part on the geo location information associated with the child. In some examples, the geo location module 110 may send separate messages to remote device 210 and geo location device 215 based at least in part on the geo location information. The messages sent to remote device 210 and geo location device 215 may be the same message sent at the same or different times, or may be separate messages with different content sent at the same or different times.

Once the rules controlling at least some operation of geo location module 110 are established via, for example, display 220 and/or user interface 225, geo location module 110 may operate automatically to generate and/or send messages based on geo location information from geo location device 215. In other examples, at least some operations and/or functionality of geo location module 110 may require manual input from one or more users such as, for example, a user that provides input via display 220 and/or user interface 225, or a person carrying remote device 210 and/or geo location device 215. In one example, preliminary actions are taken by geo location module 110 automatically in response to receiving certain data (e.g., geo location information), and one or more subsequent steps related to geo location module 110 require at least some manual input in the form of, for example, user authentication, confirmation of the message content to be sent, and the like.

Display 220 and user interface 225 may be part of device 105-a. Additionally, or alternatively, one or more of display 220 and user interface 225 may be provided separate from device 105-a such as, for example, outside of a primary housing of device 105-a. Each of remote device 210 and geo location device 215 may include one or both of a display 220 and user interface 225.

Examples of network 205 may include cloud networks, local area networks (LAN), wide area networks (WAN), virtual private networks (VPN), wireless networks (using 802.11, for example), and/or cellular networks (e.g., using 3G and/or LTE), etc. In some embodiments, network 205 may include the Internet. Separate networks 205 may be used to communicate with remote device 210 and geo location device 215.

Figure 3:
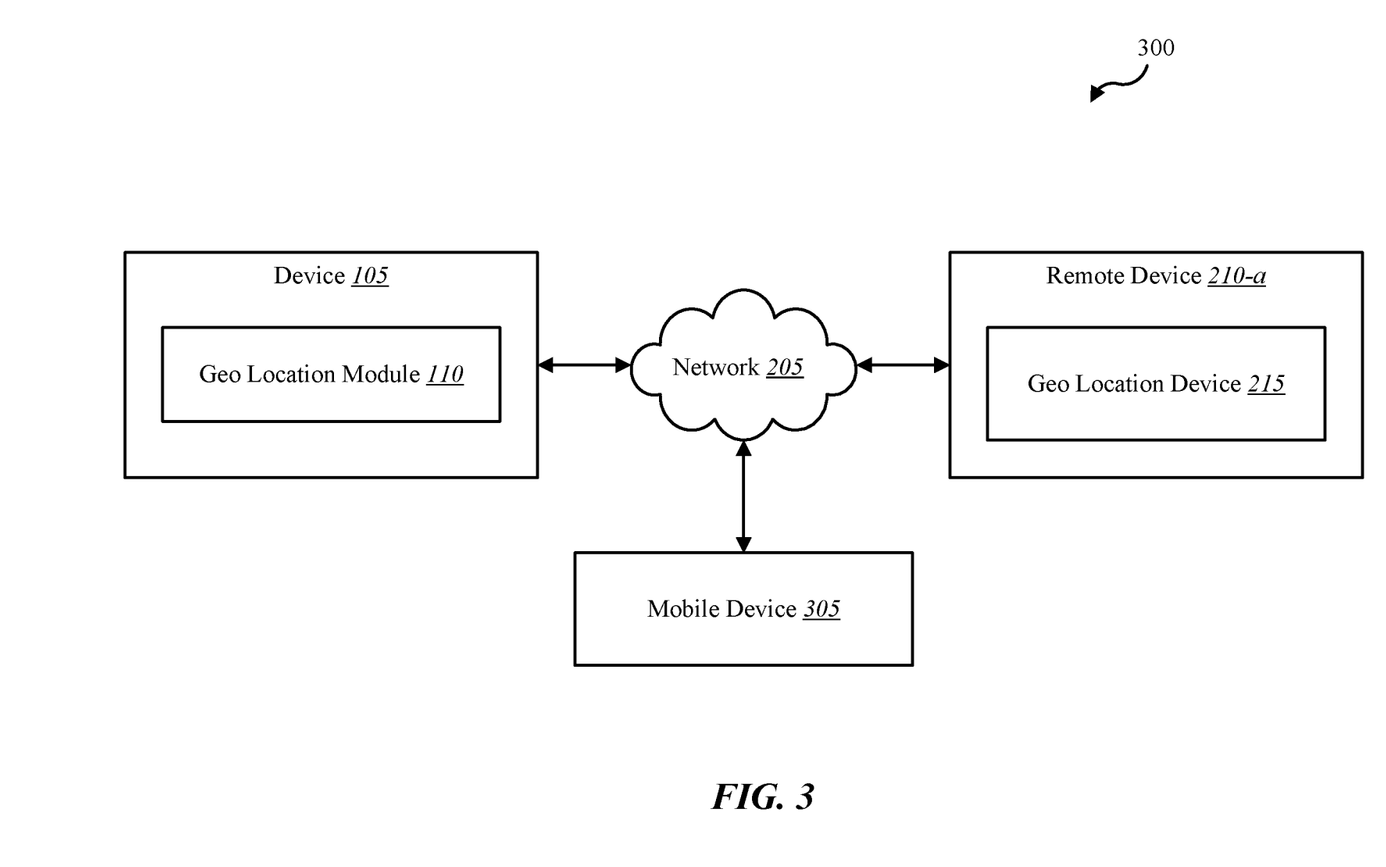
FIG. 3 is a block diagram of another environment in which the present systems and methods may be implemented.

FIG. 3 is a block diagram illustrating one embodiment of an environment 300 in which the present systems and methods may be implemented. Environment 300 may include at least some of the components of environments 100, 200, described above. Environment 200 may include, in addition to device 105 and geo location module 110, network 205, remote device 210-a having geo location device 215, and a mobile device 305.

Geo location device 215 may be part of and/or integrated into remote device 210-a. As such, the same device from which geo location information is received by geo location module 110 may be the device that receives a message from geo location module 110. Remote device 210-a may include, for example, a GPS device, a handheld computing device such as a smartphone, a laptop computer, a notebook computer, a wearable computing device, or the like. While a single remote device 210-a is shown in FIG. 3, environment 300 may include a plurality of remote devices 210-a that each include a geo location device 215. Each remote device 210-a may be carried by a separate person and/or group of persons. Remote device 210-a may include a display, user interface, speaker, microphone, and the like used to communicate a message to/from geo location module 110.

Mobile device 305 may be used to control, program or otherwise communicate with geo location module 110. In one example, mobile device 305 is used to establish one or more rules or criteria for operation of geo location module 110. In other examples, mobile device 305 provides user authorization and/or user authentication for purposes of, for example, operating certain features or functionality of geo location module 110. In other examples, geo location module 110 delivers a message to mobile device 305, wherein the message is based at least in part on geo location information provided by geo location device 215. Mobile device 305 may operate within a relative close proximity to device 105 using, for example, a first network 205. The network 205 used to communicate between geo location module 110 and mobile device 305 may be different from a network 205 used to communicate between geo location module 110 and remote device 210-a and/or geo location device 215. In other examples, mobile device 305 is operable remotely from device 105. In at least some examples, mobile device 305 comprises a mobile computing device such as a smartphone, a notebook computer, a laptop computer, or the like. Mobile device 305 may provide a user interface and/or display for interaction with device 105 and/or geo location module 110. In some examples, mobile device 305 is receptive of geo location information from geo location device 215. Mobile device 305 may communicate directly with remote device 210-a via network 205 while bypassing device 105 and/or geo location module 110.

Figure 4:
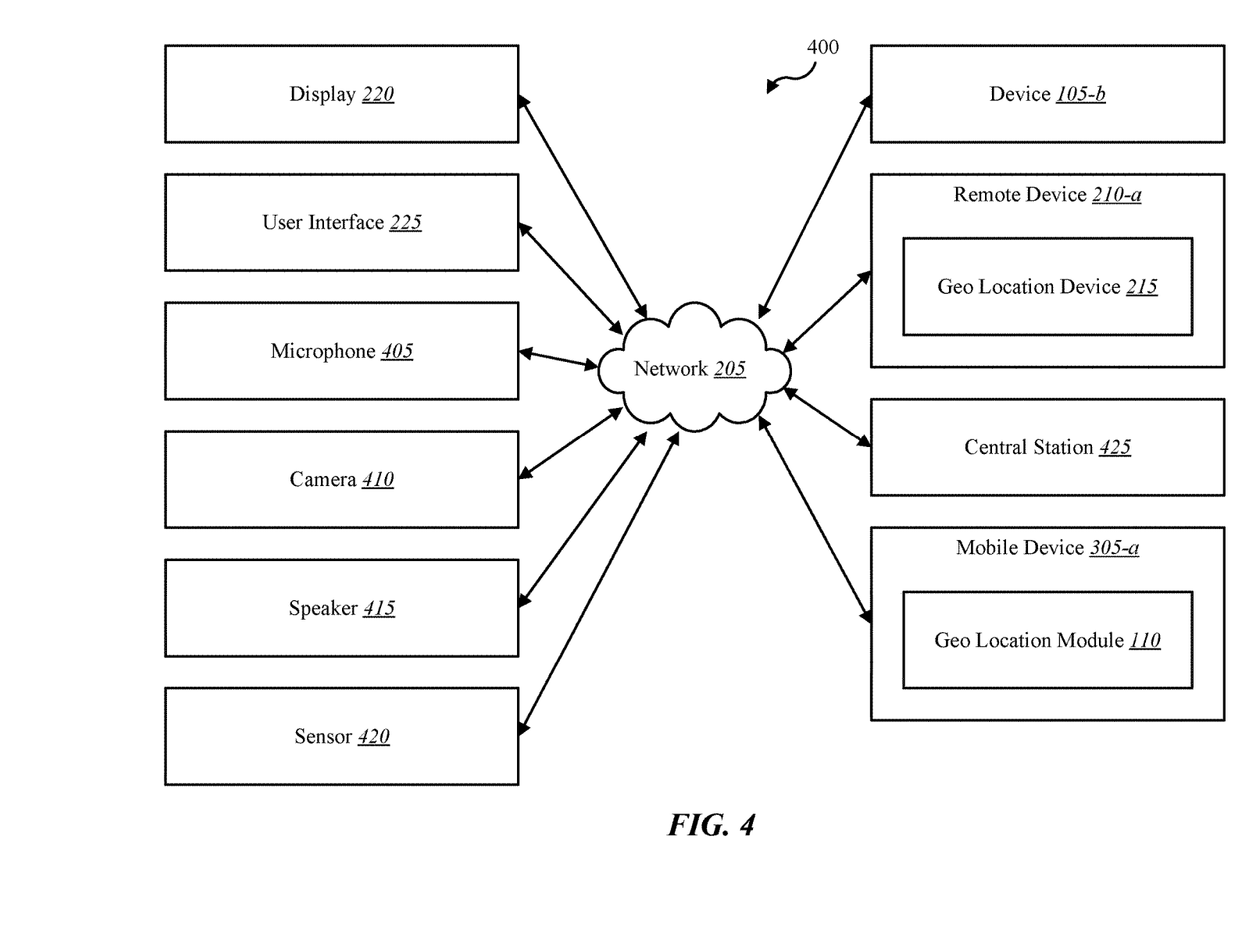
FIG. 4 is a block diagram of another environment in which the present systems and methods may be implemented.

FIG. 4 is a block diagram illustrating one embodiment of an environment 400 in which the present systems and methods may be implemented. Environment 400 may include at least some of the same components of the environment's 100, 200, 300 described above. Environment 400 may include device 105-b, remote device 210-a having geo location device 215, and mobile device 305-a having geo location module 110. Environment 400 may also include display 220, user interface 225, a microphone 405, a camera 410, a speaker 415, a sensor 420, and a central station 425. The components of environment 400 may communicate via, for example, network 205.

Device 105-b may include, for example, a control panel of a home automation system. Mobile device 305-a may communicate with device 105-b or other components of the home automation system via network 205. At least portions of the functionality of geo location module 110 may operate on mobile device 305-a. Other portions and/or functionality related to operation of geo location module 110 may occur on other devices such as device 105-b and/or central station 425. Central station 425 may include servers, backend storage, customer service, and other resources as part of the home automation system. At least some information such as the geo location information from geo location device 215 may be stored and/or analyzed at central station 425.

Display 220 and user interface 225 may provide interaction between one or more users of the home automation system and, for example, geo location module 110 or device 105-b. In some examples, geo location module 110 generates a message that is delivered to at least one of display 220, remote device 210-a and central station 425, wherein the message is based at least in part on geo location information from geo location device 215.

Display 220 may be integrated into device 105-b. At least some functionality of user interface 225 may be integrated into display 220. Display 220 may include, for example, a TV monitor, computer monitor, or display screen of device 105-b. Microphone 405, camera 410, and speaker 415 may be existing features of a home automation system (e.g., components that are permanently mounted in a home).

Microphone 405, camera 410, and speaker 415 may be operable, alone or in combination, to deliver a message generated by geo location module 110 to one or more users. Furthermore, microphone 405, camera 410, and speaker 415 may be used to generate messages that are delivered by geo location module 110 based on one or more rules and/or geo location information from geo location device 215. In one example, a user may generate a video message using camera 410 and microphone 405, and the message is delivered when geo location module 110 confirms that one or more rules have been satisfied based at least in part on geo location information received from geo location device 215. In another example, geo location module 110 delivers an audio message via speaker 415, wherein the audio message is based at least in part on geo location information. The audio message may include, for example, "Johnny has left the yard," when a boy named Johnny, who carries remote device 210-a, is confirmed to have left the yard boundary. The mother, after hearing the message via speaker 415, may send a message (e.g., an audio, text, or video message) to Johnny via geo location module 110, directly to remote device 210-a, or through a separate device. In another example, geo location module 110 may concurrently send the audio message to the mother via speaker 415 while sending a different message to Johnny via remote device 210-a asking Johnny to return home or to explain where he is going.

Sensor 420 may operate to help determine a location of one or more persons in place of or in combination with operation of geo location device 215. In one example, sensor 420 confirms that a mother has returned home, and geo location module 110 delivers a message to the mother (e.g., via display 220 and/or speaker 415) that one or more of her children has left the home and/or another geo boundary such as the yard or neighborhood. In another example, sensor 420 determines an unauthorized entry into a home and geo location module 110 sends a message to a person carrying remote device 210-a informing the person of the unauthorized entry. The message may be sent, for example, when geo location device 215 confirms that that person is outside of the home or within some other geo location.

Sensor 420 may include, for example, a camera sensor, an audio sensor, a forced entry sensor, a shock sensor, a proximity sensor, a boundary sensor, an appliance sensor, a light fixture sensor, a temperature sensor, a light beam sensor, a three-dimensional (3D) sensor, a motion sensor, a smoke sensor, a glass break sensor, a door sensor, a video sensor, a carbon monoxide sensor, an accelerometer, a global positioning system (GPS) sensor, a Wi-Fi positioning sensor, a capacitance sensor, a radio frequency sensor, a near-field sensor, a heartbeat sensor, a breathing sensor, an oxygen sensor, a carbon dioxide sensor, a brainwave sensor, a voice sensor, a touch sensor, and the like. Device 105-b may include one or more of sensors 420. Although sensor 420 is depicted as a separate component from device 105-b, in some embodiments, sensor 420 may be connected directly to any one of those components or other components of environment 400. Additionally, or alternatively, sensor 420 may be integrated into a home appliance or fixture such as a lighting fixture.

Figure 5:
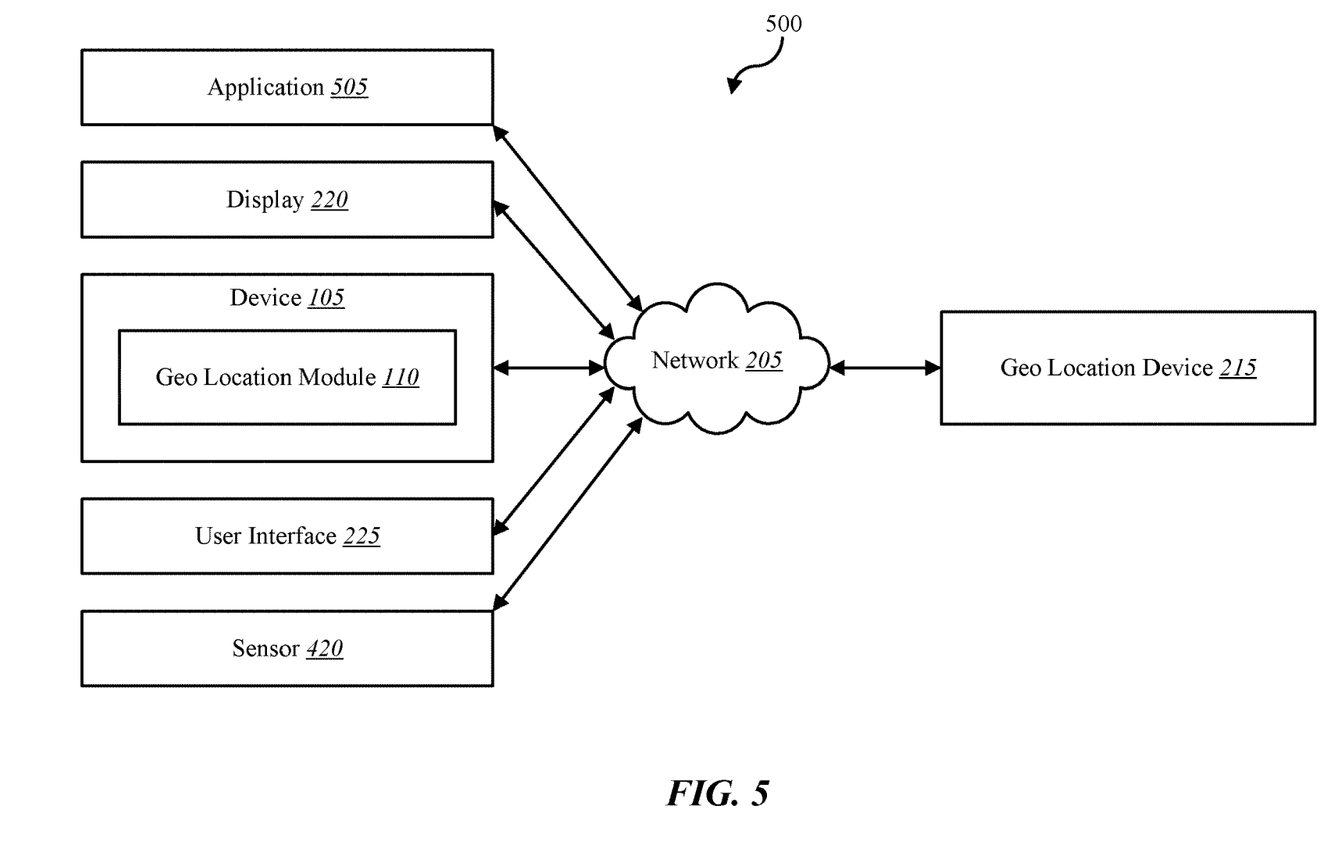
FIG. 5 is a block diagram of another environment in which the present systems and methods may be implemented.

FIG. 5 is a block diagram illustrating one embodiment of an environment 500 in which the present systems and methods may be implemented. Environment 500 may include at least some of the same components of the environments 100, 200, 300, 400 described above. Environment 500 may include device 105 having geo location module 110, network 205, geo location device 215, display 220, user interface 225 and sensor 420. Additionally, environment 500 may include application 505.

Geo location module 110 may operate based at least in part on geo location information from geo location device 215. The messages generated by geo location module 110 may be displayed on display 220. Display 220 may be located at any desired location including, for example, in close proximity to device 105 (e.g., in the same home or on the same property as device 105). Alternatively, display 220 may be located remotely such as, for example, on a remote device such as remote device 210 described above with reference to FIGS. 2-4. Display 220 may be part of a TV screen, computer monitor, or user interface (e.g., user interface 225). In some embodiments, device 220 may be part of device 105. Device 105 may include, for example, a control panel of a home automation system.

As described above, display 220 and user interface 225 may facilitate setting of rules, conveying messages (via either one-way or two-way communications such as a one-way or two-way cellular call) with geo location module 110 and/or a person associated with geo location device 215 or another person. Sensor 420 may operate to confirm a location of one or more persons such as, for example, the person associated with (e.g., carrying) geo location device 215. Sensor 420 may provide a backup and/or redundant means of determining location of one or more persons or objects. While most examples discussed herein are explained with reference to a person carrying or operating (i.e., associated with) geo location device 215, other embodiments are possible in which other objects such as pets, vehicles, appliances, electronic devices, clothing, equipment, or the like carry or otherwise are associated with geo location device 215.

Sensor 420 may also confirm or indicate occurrence of an event that is used as criteria or a trigger for satisfying a rule by which geo location module 110 operates. For example, sensor 420 may confirm that someone has exited through a front door of a house which may be used in combination with geo location information from geo location device 215 to confirm that a particular person has actually left the house. The information from both sensor 420 and geo location device 215 may be used by geo location module 110 as part of generating and/or delivering a message.

Application 505 may allow a user (e.g., a user interfacing directly with device 105 located at a property being monitored by the home automation system) to control, either directly or via device 105 and/or a separate computing device, an aspect of the monitored property including, for example, security, energy management, locking and unlocking doors, checking the status of the doors, locating a user or item, controlling lighting, thermostat, or cameras and receiving notifications regarding a current status or anomaly associated with a home, office, place of business, or the like (e.g., a property). In some configurations, application 505 may enable device 105 to communicate with geo location device 215, display 220, user interface 225, and/or sensor 420, as well as other devices or systems such as, for example, central station 425 discussed above with reference to FIG. 4. In one example, application 505 may provide the user interface 225 to display an automation, security, and/or energy management content on device 105. Thus, application 505, via user interface 225, may allow users to control aspects of their home, office, and/or other type of property, as well as control generation, delivery, and responses to messages from geo location module 110. Further, application 505 may be installed on device 105 or other components and/or features of the home automation system. Application 505 may carry out at least some functionality of geo location module 110. For example, application 505 may provide two-way communication between geo location module 110 and geo location device 215, a delivery of a message from geo location module 110 to another location (e.g., a remote device), and the like.

Figure 6:
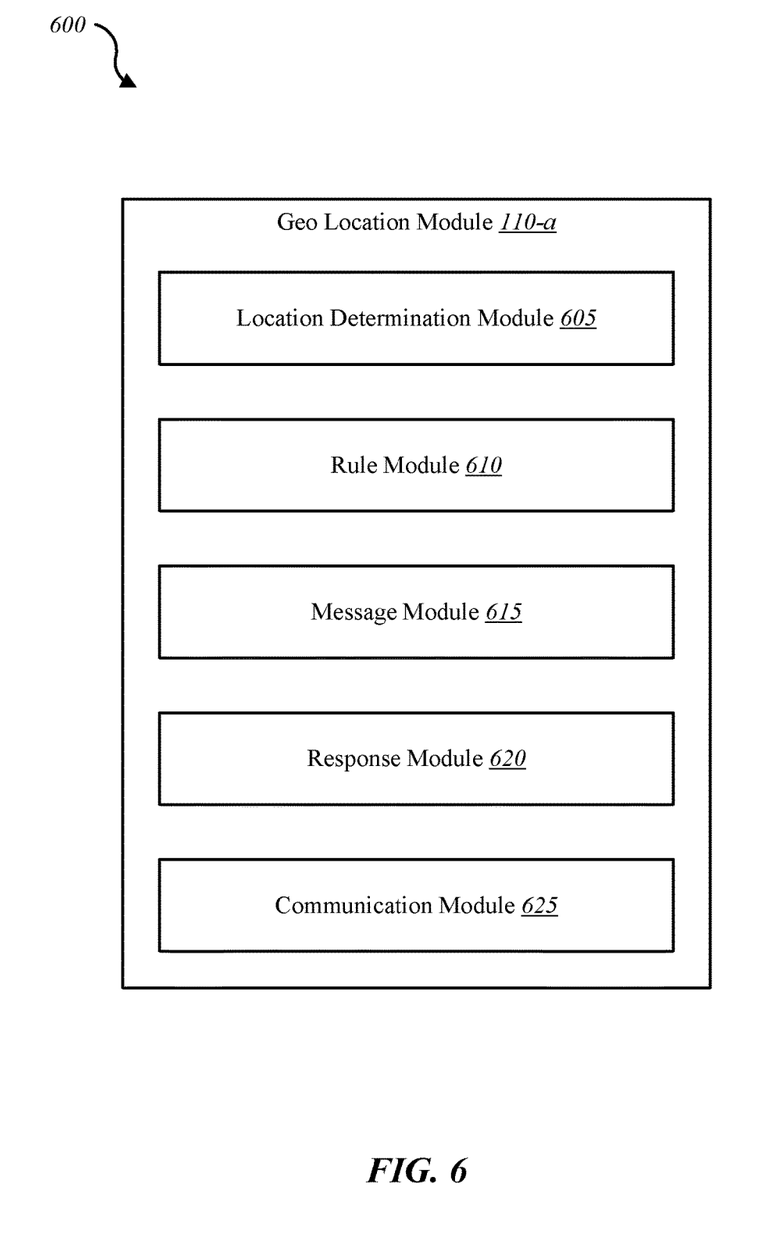
FIG. 6 is a block diagram of a geo location module of the environments shown in FIGS. 1-5.

FIG. 6 is a block diagram illustrating an example geo location module 110-a. Geo location module 110-a may be one example of the geo location module 110 described above with reference to FIGS. 1-5. Geo location module 110-*a* may include a location determination module 605, a rule module 610, a message module 615, a response module 620, and a communication module 625.

Location determination module 605 may receive geo location information from at least one geo location device. Location determination module 605 may determine at least one of a location, a direction of travel, or an activity based on the geo location information. For example, location determination module 605 may determine that a person carrying a geo location device has crossed a geo fence, entered a particular geo field, has changed direction of travel, has traveled a certain distance, or the like. Location determination module 605 may receive information from other sources such as, for example, a sensor (e.g., sensor 420 described with reference to FIGS. 4 and 5) that is used to determine and/or confirm a geo location and/or an activity.

Rule module 610 may operate to generate one or more rules and/or to confirm that one or more rules is satisfied. In one embodiment, rule module 610 may operate to receive instructions relating to establishing a rule. Rule module 610 may prompt one or more users for input as part of generating a rule. Rule module 610 may use information provided by or otherwise determined using location determination module 605 as part of setting and/or determining whether a rule is satisfied. Determining whether a rule is satisfied using rule module 610 may include receiving inputs from a plurality of sources, wherein at least some of the information relates to geo location.

Message module 615 may operate to generate at least one message. The message may be delivered based at least in part on geo location information (e.g., via operation of location determination module 605 and/or rule module 610). Message module 615 may receive instructions from one or more sources related to generation of the message. In some embodiments, message module 615 may prompt one or more users for information as part of generating a message. The message may be in the form of, for example, an audio message, a video message, a text message, a vibration, or the like. Message module 615 may generate a plurality of different messages that may be associated with particular geo location information. Message module 615 may include a plurality of pre-programmed messages. Alternatively, one or more of the messages generated by or available via message module 615 may be generated based at least in part on a manual input from one or more users. Message module 615 may select among a plurality of pre-programmed messages based on satisfaction of one or more criteria and/or rules.

Message module 615 may also operate to deliver one or more messages. Messages may be delivered based on the satisfaction of one or more rules or criteria. Message module 615 may determine who the message should be sent to based at least in part on, for example, the type of message, the message format, the geo location information upon which the message is based, or some other criteria. Message module 615 may deliver the message locally or remotely. In some examples, message module 615 may deliver a message to the same device from which the geo location information is received. In other examples, separate messages with different content are sent to different recipients (e.g., a child and a parent of the child).

Response module 620 may receive responses from one or more sources as a result of the original message delivered from message module 615. In one example, a message from message module 615 is delivered to a smartphone of a parent when geo location information indicates that a child has moved outside of a geo fence. The parent may generate a responsive message that is received at response module 620. Response module 620 may initiate an operation based on a responsive message that instructs message module 615 to, for example, send a message to a device carried by the child, send a message to a neighbor, contact emergency personnel, or the like. Response module 620 may prompt a user for additional information and/or input as a result of receiving the responsive message. Response module 620 may determine what type of communication medium should be used. For example, response module 620 may, in response to receiving a responsive text message, generate a two-way phone call or prompt message module 615 to send an audio or video message to one or more persons.

Communication module 625 may facilitate communications between geo location module 110-*a* and other devices and/or persons. For example, communication module 625 may facilitate communication with a device (e.g., device 105 described with reference to FIGS. 1-5) of a home automation system. Communication module 625 may facilitate communications between geo location module 110-*a* and a remote device, a mobile device, a geo location device, a central station, audio and video devices, sensors, displays, and the like (e.g., see components of environments 100, 200, 300, 400, 500 described above).

Figure 7:
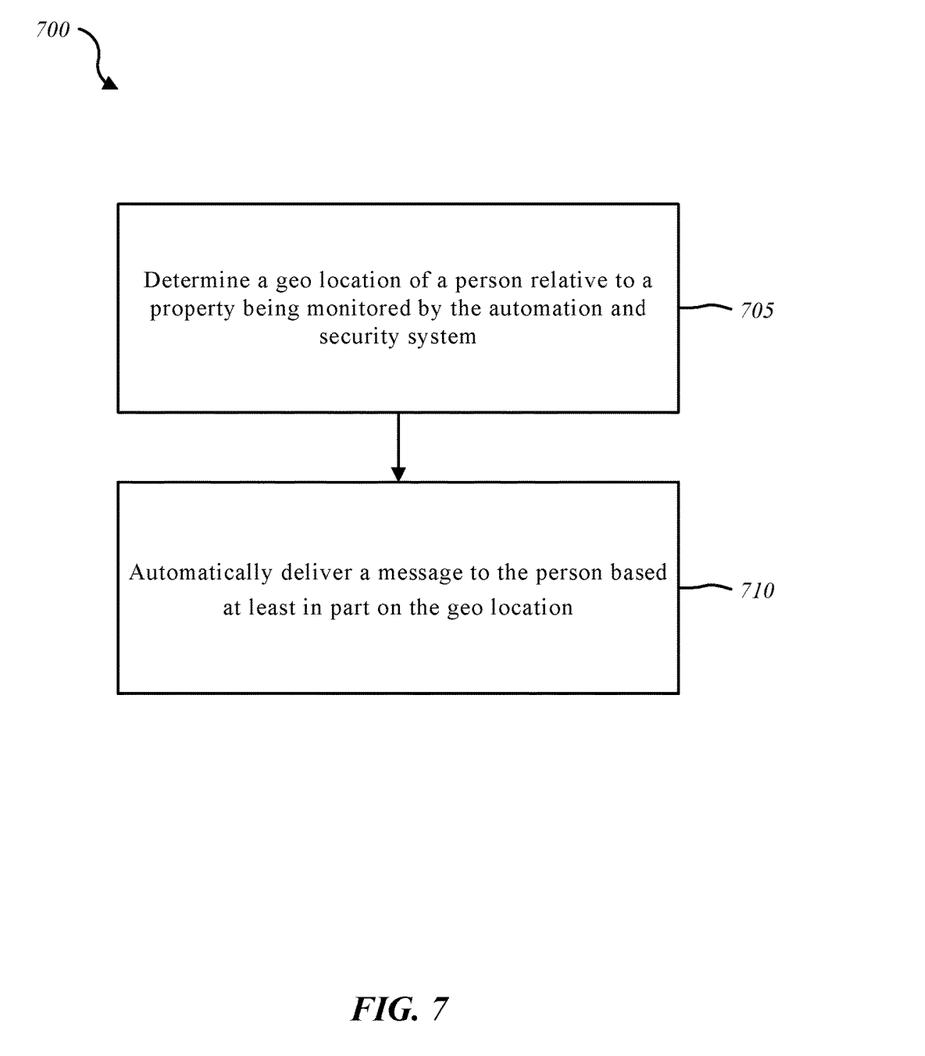
FIG. 7 is a flow diagram illustrating a method for communicating based on geo location information using an automation and security system.

FIG. 7 is a flow diagram illustrating one embodiment of a method 700 for communicating based on geo location information using an automation and security system. In some configurations, the method 700 may be implemented by the geo location module 110 shown and described with reference to FIGS. 1-6. In other examples, the method 700 may be performed generally by device 105 shown in FIGS. 1-5, or even more generally by environments 100, 200, 300, 400, 500 shown in FIGS. 1-5.

At block 705, the method 700 includes determining a geo location of a person relative to a property being monitored by the automation and security system. Block 710 includes automatically communicating a message to the person based at least in part on the geo location.

Method 700 may also include establishing at least one rule based at least in part on the geo location and automatically communicating the message to the person based on the at least one rule. The message may include at least one of a text message, an audio message, a two-way message, and an email. The message may be a pre-recorded audio message. Method 700 may include determining a geo fence associated with the property, wherein determining that the geo location is outside of the geo fence prompts automatic communication of the message. Method 700 may include determining a change in the geo location, and automatically delivering the message based at least in part on the change in geo location.

Figure 8:
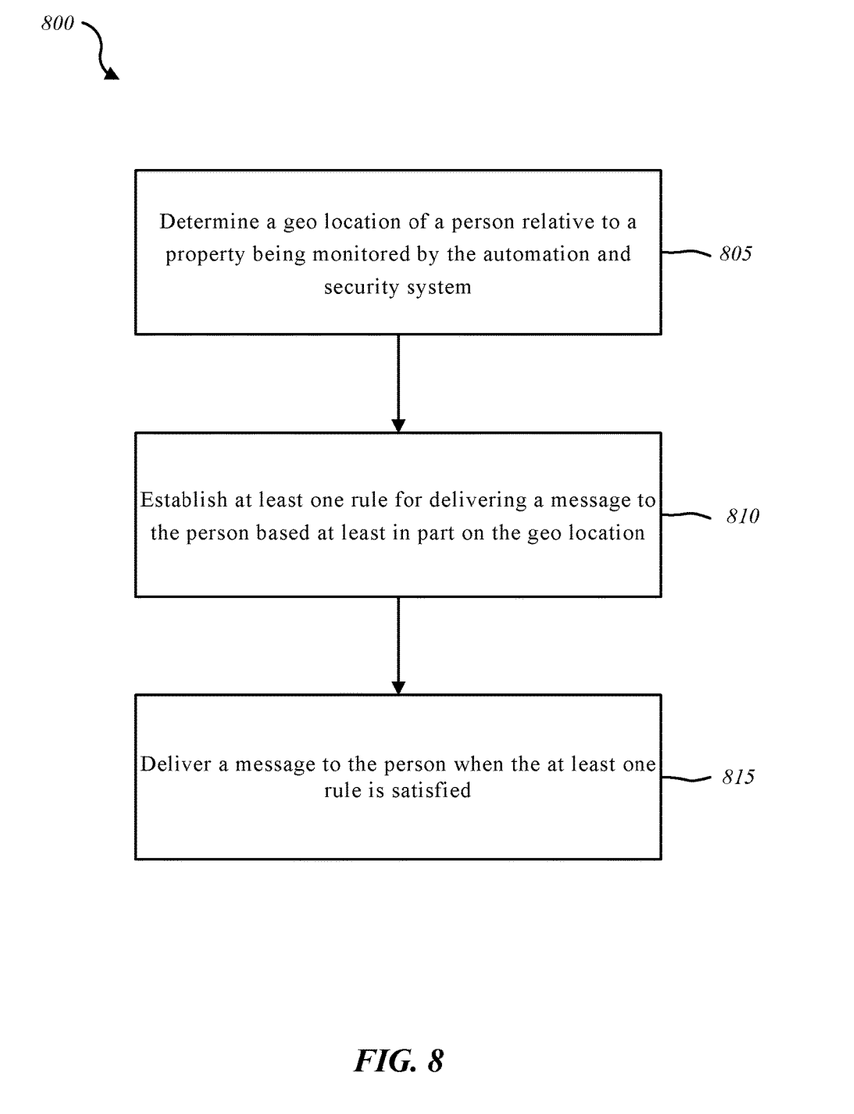
FIG. 8 is a flow diagram illustrating another method for communicating based on geo location information using an automation and security system.

FIG. 8 is a flow diagram illustrating one embodiment of a method 800 for communicating based on geo location information using an automation and security system. In some configurations, the method 800 may be implemented by the geo location module 110 shown and described with reference to FIGS. 1-6. In other examples, the method 800 may be performed generally by device 105 shown in FIGS. 1-5, or even more generally by environments 100, 200, 300, 400, 500 shown in FIGS. 1-5.

At block 805, method 800 includes determining a geo location of a person relative to a property being monitored by the automation and security system. At block 810, method 800 includes establishing at least one rule for delivering a message to the person based at least in part on the geo location. Block 815 includes communicating a message to the person when the at least one rule is satisfied.

The message of method 800 may be communicated through a control panel of the automation and security system. The rule may be established via a user interface of the automation and security system. The geo location may be determined at least in part from a global positioning system (GPS) device carried by the person. The message may be delivered to a mobile computing device carried by the person. The at least one rule may include a plurality of rules, and delivering the message may occur after at least two of the plurality of rules are satisfied.

Figure 9:
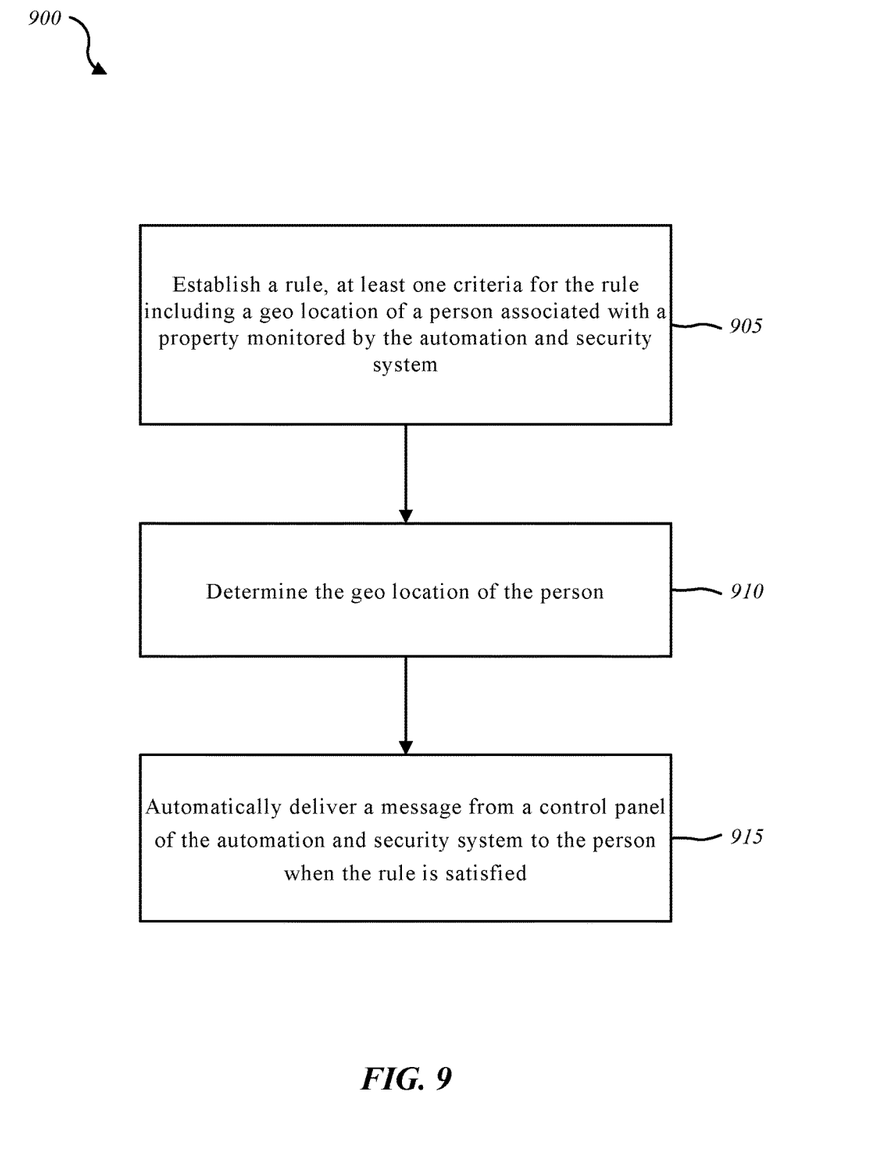
FIG. 9 is a flow diagram illustrating another method for communicating based on geo location information using a home automation system.

FIG. 9 is a flow diagram illustrating one embodiment of a method for communicating based on geo location information using an automation and security system. In some configurations, the method 900 may be implemented by the geo location module 110 shown and described with reference to FIGS. 1-6. In other examples, the method 900 may be performed generally by device 105 shown in FIGS. 1-5, or even more generally by environments 100, 200, 300, 400, 500 shown in FIGS. 1-5.

Block 905 includes establishing a rule, wherein at least one criteria for the rule includes a geo location of a person associated with a property monitored by the automation and security system. Block 910 of method 900 includes determining the geo location of the person. Block 915 includes automatically delivering a message from the control panel of the automation and security system to the person when the rule is satisfied.

The rule of method 900 may be established via user input at the control panel. The geo location may be determined at least in part by communications with a global positioning system (GPS) device carried by the person. The message may be delivered to a device carried by the person that includes the GPS device. Method 900 may include receiving a manual input from the at least one user that authorizes delivery of the message. The message may be delivered automatically when a rule is satisfied. The message may be conveyed via a two-way call initiated by the control panel. The control panel may include a speaker and a microphone, and operate as a speaker phone for two-way communication with the person.

Figure 10:
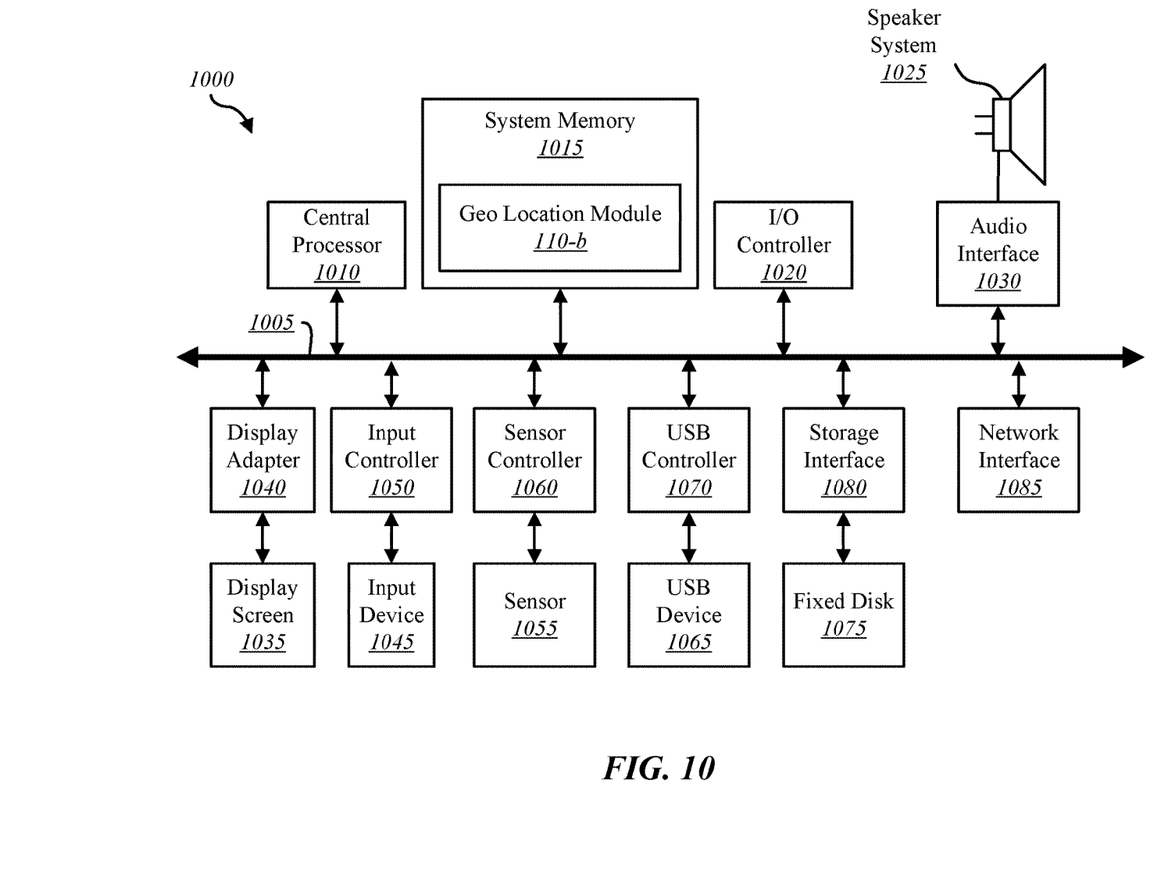
FIG. 10 is a block diagram of a computer system suitable for implementing the present systems and methods of FIGS. 1-9.

FIG. 10 depicts a block diagram of a controller 1000 suitable for implementing the present systems and methods. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the geo location module 110-*b* to implement the present systems and methods may be stored within the system memory 1015. Applications resident with controller 1000 are generally stored on and accessed via a non-transitory computer readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk drive 1075. The operating system provided on controller 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer implemented method for communicating based on geo location information using an automation and security system at a property, comprising:
   determining, via a processor of a control panel of the automation and security system, a geo location of a first mobile device and a geo location of a second mobile device;
   determining, via the processor, the geo location of the first mobile device is outside a geo fence associated with the property;
   detecting, via one or more sensors of the automation and security system, activity relative to at least one of the property or the geo fence, wherein the detecting provides backup means to the geo location of the first mobile device or supplants the geo location of the first mobile device in determining a location associated with the first mobile device; and
   delivering, via the processor, a first message to at least one of a speaker of the control panel or the second mobile device, wherein the first message is based at least in part on the geo location of the first mobile device being outside the geo fence, the detecting, or both.

2. The method of claim 1, wherein the first message includes at least one of a text message, an audio message, a two-way call, an email, or any combination thereof.

3. The method of claim 1, wherein detecting the activity further comprises:
   indicating the activity satisfies a criterion threshold; and
   confirming the geo location of the first mobile device.

4. The method of claim 1, further comprising:
   sending with the first message a prompt, the prompt including requesting at least one of (a) authorization to send a second message to the first mobile device, and (b) whether to modify or add to the second message.

5. The method of claim 4, wherein sending the prompt further comprises:
   appending at least one of procedural instructions or a question to the prompt, each of the procedural instructions and/or question directed to a user of the first mobile device.

6. The method of claim 1, further comprising:
   delivering, to the first mobile device, a second message, the second message including at least one of an indication the first mobile device is outside the geo fence, a notification of the activity, or both.

7. The method of claim 6, wherein the first message is delivered during a first temporal instance and the second message is delivered during a second temporal instance.

8. The method of claim 6, wherein the first message and the second message are delivered synchronously, bypassing sending a prompt with the first message.

9. The method of claim 6, further comprising:
   sending with the second message a prompt, the prompt including a request to respond to the second message.

10. The method of claim 6, further comprising:
    receiving, at the control panel, one or more reply messages from the first mobile device in response to the second message;
    displaying, at a user interface of the control panel, the one or more reply messages from the first mobile device; and
    generating a response message for transmission, the response message directed to the first mobile device, the second mobile device, a third party, or a combination thereof.

11. The method of claim 6, further comprising:
    establishing at least one rule based at least in part on the geo location of the first mobile device, the geo location of the second mobile device, or both; and
    automatically delivering the first message, the second message, or the first and second messages based on the at least one rule.

12. The method of claim 11, the geo fence being programmed by user input at the control panel and the at least one rule being established via the user input at the control panel.

13. The method of claim 1, further comprising:
initiating, by the control panel, a two-way telephone call between the control panel and either the first mobile device or the second mobile device.

14. The method of claim 1, further comprising:
determining a change in at least one of the geo location of the first mobile device; and
automatically delivering the first message to the second mobile device based on the change in the geo location.

15. An apparatus for communicating based on geo location information using an automation and security system at a property, comprising:
- a processor of a control panel of the automation and security system;
- a memory in electronic communication with the processor; and
- instructions stored in the memory, the instructions being executable by the processor to:
  - determine, at the processor of the control panel, a geo location of a first mobile device and a geo location of a second mobile device;
  - determine, at the processor of the control panel, the geo location of the first mobile device is outside a geo fence associated with the property
  - receive, at the control panel, an indication of activity from one or more coupled sensors of the automation and security system, the activity relative to at least one of the property or the geo fence, wherein the indication of activity provides backup means to the geo location of the first mobile device or supplants the geo location of the first mobile device in determining a location associated with the first mobile device; and
  - deliver, via the control panel, a first message to at least one of a speaker of the control panel or the second mobile device, wherein the first message is based at least in part on the geo location of the first mobile device being outside the geo fence, the indication of activity, or both.

16. The apparatus of claim 15, the instructions being executable by the processor to:
deliver a second message to the first mobile device, the second message including at least an indication the first mobile device is outside the geo fence, a notification of the activity, or both.

17. A non-transitory computer-readable medium storing instructions executable by a processor of a control panel of an automation and security system to:
- determine a geo location of a first mobile device and a geo location of a second mobile device;
- determine the geo location of the first mobile device is outside a geo fence associated with a property
- receive an indication of activity from one or more coupled sensors of the automation and security system, the activity relative to at least one of the property or the geo fence, wherein the indication of activity provides backup means to the geo location of the first mobile device or supplants the geo location of the first mobile device in determining a location associated with the first mobile device; and
- deliver a first message to at least one of a speaker of the control panel or the second mobile device, wherein the first message is based at least in part on the geo location of the first mobile device being outside the geo fence, the indication of activity, or both.

18. The computer-readable medium of claim 17, wherein the instructions are executable to:
deliver a second message to the first mobile device, the second message including at least an indication the first mobile device is outside the geo fence, a notification of the activity, or both.

* * * * *